US008262103B2

(12) United States Patent
Enserink et al.

(10) Patent No.: US 8,262,103 B2
(45) Date of Patent: Sep. 11, 2012

(54) VEHICLE FOR CARRIAGE OF CHILDREN

(75) Inventors: Anton Rudolf Enserink, Rotterdam (NL); Jaap Jozua Van Boxtel, Delft (NL)

(73) Assignee: Thule Child Transport Systems Ltd., Vancouver (CA)

(*) Notice: Subject to any disclaimer, the term of this patent is extended or adjusted under 35 U.S.C. 154(b) by 557 days.

(21) Appl. No.: 12/293,451

(22) PCT Filed: Mar. 19, 2007

(86) PCT No.: PCT/NL2007/000080
§ 371 (c)(1),
(2), (4) Date: Nov. 1, 2008

(87) PCT Pub. No.: WO2007/108676
PCT Pub. Date: Sep. 27, 2007

(65) Prior Publication Data
US 2009/0206566 A1    Aug. 20, 2009

(30) Foreign Application Priority Data

Mar. 20, 2006   (NL) ...................................... 1031406

(51) Int. Cl.
*B62B 1/04*    (2006.01)
*B62B 3/02*    (2006.01)
*B62B 7/00*    (2006.01)
*B62D 21/14*   (2006.01)

(52) U.S. Cl. .......... 280/31; 280/204; 280/467; 280/643; 280/648; 280/656; 280/658; 280/43; 280/47.25; 280/47.38; 280/47.41

(58) Field of Classification Search .................. 280/204, 280/292, 647, 30, 31, 304.1, 415.1, 416, 280/642, 643, 644, 648, 649, 650, 656, 657, 280/658, 43, 47.25, 47.38, 47.39, 47.41
See application file for complete search history.

(56) References Cited

U.S. PATENT DOCUMENTS

| 2,450,051 | A | * | 9/1948 | Manning ....................... 280/647 |
| 4,754,987 | A | * | 7/1988 | Williams .................... 280/304.1 |
| 5,076,599 | A | * | 12/1991 | Lockett et al. ................ 280/204 |
| 5,267,744 | A | * | 12/1993 | Berry et al. ................... 280/204 |
| 5,454,577 | A | * | 10/1995 | Bell .............................. 280/204 |

(Continued)

FOREIGN PATENT DOCUMENTS

DE       19818724       10/1999

(Continued)

OTHER PUBLICATIONS

PCT/NL2007/000080 International Search Report mailed Mar. 3, 2008 (2 pages).

*Primary Examiner* — John R Olszewski
(74) *Attorney, Agent, or Firm* — Wilmer Cutler Pickering Hale and Dorr LLP (57) ABSTRACT

Vehicle for carriage of children, comprising a frame and at least two wheels which are attached to the frame. The vehicle can be transformed between at least a first configuration as pushable buggy and a second configuration for use as a towed trailer, and in both first and second configurations provides room for at least one child. The vehicle can be transformed between the first and second configuration by adjusting the width of the frame and location of the center of gravity.

21 Claims, 6 Drawing Sheets

U.S. PATENT DOCUMENTS

| | | | |
|---|---|---|---|
| 5,474,316 A | 12/1995 | Britton et al. | |
| 5,577,746 A | 11/1996 | Britton et al. | |
| 5,921,571 A * | 7/1999 | Bell | 280/204 |
| 5,947,497 A * | 9/1999 | Hsu | 280/204 |
| 5,979,921 A * | 11/1999 | Derven et al. | 280/204 |
| 6,196,572 B1 | 3/2001 | Durrin | |
| 6,663,126 B2 | 12/2003 | Britton et al. | |
| 6,764,087 B2 | 7/2004 | Assaf et al. | |
| 6,767,028 B2 | 7/2004 | Britton et al. | |
| 6,929,274 B2 | 8/2005 | Britton et al. | |
| 6,976,697 B2 | 12/2005 | Britton et al. | |
| 7,052,026 B2 | 5/2006 | Sutherland | |
| 7,168,761 B2 | 1/2007 | Britton et al. | |
| 7,172,206 B2 * | 2/2007 | Staszak | 280/204 |
| 7,354,058 B2 * | 4/2008 | Chou | 280/651 |
| 7,431,324 B2 | 10/2008 | Britton et al. | |
| 7,445,222 B2 * | 11/2008 | Bell | 280/204 |
| 7,547,029 B2 | 6/2009 | Britton et al. | |
| 2001/0002745 A1 | 6/2001 | Weber | |
| 2003/0067138 A1 * | 4/2003 | Kahmann | 280/415.1 |
| 2005/0099025 A1 | 5/2005 | Sutherland | |
| 2006/0237932 A1 * | 10/2006 | Moore | 280/47.41 |
| 2007/0063474 A1 * | 3/2007 | Bell | 280/204 |
| 2008/0067776 A1 | 3/2008 | Britton | |
| 2009/0026817 A1 | 1/2009 | Britton et al. | |

FOREIGN PATENT DOCUMENTS

| | | |
|---|---|---|
| DE | 102005029448 | 1/2007 |

* cited by examiner

VEHICLE FOR CARRIAGE OF CHILDREN

CROSS-REFERENCES TO RELATED APPLICATIONS

This application is a US National Stage of International Application No. PCT/NL2007/000080, filed 19 Mar. 2007, which claims the benefit of NL 1031406, filed 20Mar. 2006.

The invention relates to a vehicle for carriage of children, comprising a frame and at least two wheels mounted to that frame, which vehicle can be transformed between at least a first configuration as pushable buggy and a second configuration as a trailer to be pulled by another vehicle, an in both first and second configuration offers room for at least one child.

Bike-trailers for carriage of children, which can be equipped with a push bar and one or more removable or retractable support wheels to use the bike-trailer as pushable buggy are well-known. It is also known that bike-trailers, for reasons of stability having a considerable vehicle-width, without adaptions being made to specifically the width, from a perspective of maneuverability in narrow spaces as found in walking areas such as shopping centers are quite unpractical and therefore have limited deployability. The vehicle according to the invention is thereto equipped with and option to adapt the vehicle width.

An example of such a vehicle is known from US-A1-2001/0002745. The known vehicle comprises a means for adapting the height and/or track width. This means comprises an inserting projecting part that, when installed, leaves the original bearing or axle-holder unchanged in its function to anchor a walking-wheel. The means incorporates at least one other bearing or axle-holder for alternatively anchoring a walking wheel.

A disadvantage from the known vehicle is that the user has to remove the stub axle and mount it into the other bearing or axle-holder to transform the vehicle between the first and second configuration.

The invention intends to provide a vehicle as aforesaid which is easier to transform between the first and second configuration.

This objective is met by means of the vehicle according to the invention with the characteristic that the vehicle is transformable between the first and second configuration by adjusting the frame.

Because the vehicle is transformable by adjusting the frame, that is by moving frame parts relative to each other, it is not required to remove the wheels to make the vehicle more suitable for the chosen function.

An additional benefit is that the vehicle is saver. Improper locking in one of the two configurations does not lead to disassembly of structural parts.

From DE-A1-198 18 724 a bike-trailer is known, where an axle construction is applied, which allows for a variable track width adjustment by means of a quick adjustment, therewith providing an optimal bike-trailer/pushable buggy combination in that respect that the vehicle width is adjustable for use as both bike trailer and pushable buggy.

The rear axle is designed as a tube, wherein stub axles are inserted. The axle ends are anchored by means of bolts which are inserted though bores through the tube and stub axles. The stub axles have two or more bores, in order to provide adjustment to a track width of choice. Hence, the vehicle is not transformable by adjusting the frame A known disadvantage of the aforementioned bike-trailers is that the position of the center of gravity is not usually for the use as pushable buggy, because it is located too far backwards, namely at a position suitable for bike-trailers close to the rear axle. Another known disadvantage is, that when in use as pushable buggy, the seating position of the passenger or passengers is too low, causing the escorting person to have to bend deep to to take the children in and out of the vehicle, and causing a limited view from the seat.

Yet another known disadvantage is, that the front wheels need to be removed from the construction in case the vehicle is used as bike trailer, since the low construction provides too little space for storing these wheels away from the ground. A further disadvantage is that the vehicles, when used as pushable buggy, are still too long for good maneuverability in narrow spaces Yet another known disadvantage of the aforementioned bike trailers is that the adjustment can only take place when the vehicle is not loaded, since the weight of any cargo would cause the adjustment construction to jam, as well a increase the grip of the wheels to the ground, requiring the use of disproportional force to make the adjustment, which could be inconvenient and even cause damage to the construction.

Regarding the last known disadvantage it needs to be mentioned that infants tend to lovely doze off inside bike trailers, and that their nap needs to be rudely disturbed to transform the the vehicle from one configuration to another.

In a preferred embodiment of the invention the wheels are suspended to rotate in their respective planes of rotation, which at least in the riding direction are parallel, where the largest distance in a direction perpendicular to the riding direction between the respective planes of rotation in the second configuration is larger than the first configuration. The largest distance corresponds with the distance between the points where, when in use, the wheels touch the supporting ground. Thus, the track width in the second configuration is wider. This has the advantage, that when using the vehicle as pushable buggy, with smaller track width, it is easier to maneuver in narrow spaces. When used as a trailer towed by another vehicle, the track width is wider, which is sought to ensure stability at higher speeds. More specifically, the chance of toppling over is reduced.

Preferably, the vehicle comprises a cargo carrying part, which, when in use, lies closer to the wheel supporting ground in the second configuration than in the first configuration. This provides a lower center of gravity of the loaded vehicle, improving the for higher speeds required stability for when used as trailer towed by another vehicle.

When used as pushable buggy, it is not required to bend deeply to put in or take out one or more infants or luggage in the vehicle.

Especially where the cargo carrying part comprises an infant seat the seated infant will be raised above the knees and lower legs of adults. The view of the infant will be more interesting, while contact with the escorting person improves.

In a preferred embodiment the vehicle comprises a mechanism linking the movement of the part containing the wheel suspension relative to the frame in a direction perpendicular to the riding direction and a movement of the cargo carrying part of the frame in another direction. This way the vehicle can be adjusted in two ways to the desired type of use with minimal operation.

Preferably, the vehicle comprises a load carrying part, comprising at least three hingeably joined parts in a row positioned perpendicular to the riding direction, with the two extremities of the joined parts each hingeably joined to a part of the frame that, when in use, is rigidly connected in a direction perpendicular to the riding direction to a wheel suspension point. Thus, of the three joined parts, the middle part will move automatically in a direction perpendicular to the riding direction, preferably mainly in a direction perpendicular to a ground supporting the wheels. The track width and the center of gravity do therefore not separate adjusting.

The relation of the travel of the center of gravity to the amount track width reduction is determined by the length of the joined parts.

Preferably the three hingeably joined parts, in the configuration as bike-trailer, when they are folded out and aligned, form a wide seat with place for two infants. In the configuration as pushable buggy the two outer parts of this seat will fold down, automatically creating a narrow seat.

In a preferred embodiment the vehicle comprises a cargo carrying part, with the wheels suspended to rotate in their respective planes of rotation, which at least in the riding direction are parallel, where the cargo carrying part in the second configuration is moved relative to the first configuration in the riding direction. This embodiment offers the option to place the cargo, preferably a seat with an infant, in the second configuration, when used as trailer, closer to the wheel axles.

This lowers the downward pressure of a hitch on the towing vehicle. In the first configuration, when used as pushable buggy, it can be desired to move the center of gravity forward parallel to the riding direction, to avoid the vehicle from inadvertently tipping over backwards.

In a further preferred embodiment at least one wheel suspension point is connected to a main part of the frame by means of a traversing support construction, which support construction comprises four hingeably joined parts in a parallelogram, where the wheel suspension point is positioned in line with one, perpendicular to the riding direction, side of the four sides of the parallelogram.

Thus, the wheel suspension point is movable perpendicular to the riding direction, in order to achieve increment of the track width.

Preferably the vehicle comprises a bracket which rotates about a revolving axis, and a rod, wherein the rod at a first extremity is hingeably joined at a point on the bracket at a fixed location form the revolving axis and at a second extremity hingeably joined to a part of the traversing support construction connected to the wheel suspension point in such a way that the wheel suspension point moves in a direction perpendicular to the riding direction when the bracket is turned. By applying a system of two rods connected to the bracket, the transformation of two opposing parallelogram shaped traversing support constructions is synchronized. This provides a simple operating mechanism to adjust the track width. The bracket can, in some preferred embodiments, be used to create a lever, so that the track width can be changed with little effort.

More preferably, the bracket is linked to a cargo carrying part of the frame and is the revolving axis is oriented in such a way that the cargo carrying part is moved by turning the bracket about an horizontal axis perpendicular to the riding direction. As a result the cargo carrying part, and therewith the center of gravity, is transferred in the riding direction as well as upwards relative to the ground.

Thus, the bracket at the same time serves as means to adapt the track width and to relocate the center of gravity in loaded state.

In yet another preferred embodiment a similar parallelogram mechanism is applied to adjust the track width during the transformation from bike-trailer to pushable buggy, where with the reduction of the width of the vehicle, a part of the seat is retracted, for instance by folding or rolling up by the width reduction movement of a part of an amount of cloth which is stretched by a part of the frame, or by storing a part of the seat below or behind another part of the seat.

Thus a bike trailer for two children is established which converts easily into a pushable buggy, which by the width reduction to pushable buggy offers space for one child, while the track width is narrowed down and the center of gravity is translated both forward as upward.

In a similar embodiment, where one part of the seat is mounted rigidly to the frame, the seat is split up in two parts during the transformation from bike trailer into a pushable buggy, while a movable part of the seat, by means of a parallelogram mechanism, is translated to a position above and before the rigidly mounted part of the seat.

Thus a bike trailer for two children is established which converts easily into a pushable buggy, where the buggy state allows for transportation of two infants, with one infant located above and before the other, while the track width is narrowed down and the center of gravity is translated both forward as upward.

In yet another embodiment the cargo carrying part of the frame is, by transforming from a bike trailer into a pushable buggy, moved as a whole relative to the wheel suspension by two symmetrically positioned and independent operating parallelogram mechanisms which work in a slanting plane, which slanting plane accomplishes that the center of gravity in the pushable buggy state is located further forward and higher than in the bike-trailer state. The parallelogram mechanisms are in both extreme positions equipped with an automatic locking mechanism, as known from for instance door locks and locking devices for bonnets. Although this embodiment can also be equipped with a mechanism for synchronization such as the above mentioned rod, the transformation of this vehicle can also be achieved by shortly lifting it up as a whole after releasing the locking mechanisms, to provide clearance for the parallelogram mechanisms so they can fall, aided by gravity, from one state into the other. This is preferably achieved by shortly lifting each side of the vehicle alternately, so the parallelogram mechanisms can change from one state into the other one by one, creating a somewhat slanted but stable intermediate position. By transforming the vehicle from bike-trailer into a pushable buggy and vice versa through this intermediate position the required muscular force is lowered because only one side of the vehicle needs to be lifted, thus allowing for the intended transformation to be carried out easily with one or two infants aboard of the vehicle. An additional advantage of this lifting method is that wholly or partly lifting the vehicle takes away the pressure of the wheels on the ground so that the friction of the wheels do not hinder the operation of the transformation mechanism. This embodiment further enables positioning of the cargo carrying part of the vehicle partly below the wheel axles, thus creating an even more stable and therefore safer roadholding in the bike-trailer state. By choosing the proportions and the positions of the parts of the parallelogram mechanism such that the wheels can be placed completely below the cargo carrying part of the frame in the boggy position, the total width of the cargo carrying part can be maintained. This enables designing the cargo carrying part in such a way that two infants can be transported in both bike-trailer and pushable buggy state.

At the front of the vehicle of this embodiment a front bracket is attached which can rotate about a horizontal and perpendicular to the riding direction positioned axis and can be locked in at least two positions, to which bracket mounting points for support wheels are be attached. By transforming from a bike-trailer to a pushable buggy, this bracket can be turned and locked in such a way that the support wheels touch the ground, while the whole vehicle shortens in the riding direction, which improves the maneuverability of the vehicle. In this embodiment, the front bracket further features two footrests, enabling the children to use a footrest in both states, which is beneficial to the comfort in both configurations, and which simplifies getting in and out of the vehicle.

In this way this embodiment according to the invention provides a simple, safe and easy to operate transforming vehicle which offers space for two infants which can remain seated during transformation, and where the front support wheels can be moved towards the ground easily, and where the length of the vehicle is shortened in order to provide optimal maneuverability in narrow spaces.

Preferably the frame is equipped with a device for attaching a hitch, which can be coupled to a towing vehicle. Thus a towed trailer combination is achieved. The advantage of a hitch is that the trailer is kept at a distance from the towing vehicle. Both permanently connected and removable hitch designs are possible.

Preferably, device is adjusted to allow swiveling of the hitch relative to the frame. Thus, the hitch can be swiveled sideways or upwards when the vehicle is not in the second configuration, for instance when the vehicle is used as pushable buggy.

The invention will be further explained in the following by means of the accompanying drawings, where.

Figure 1:
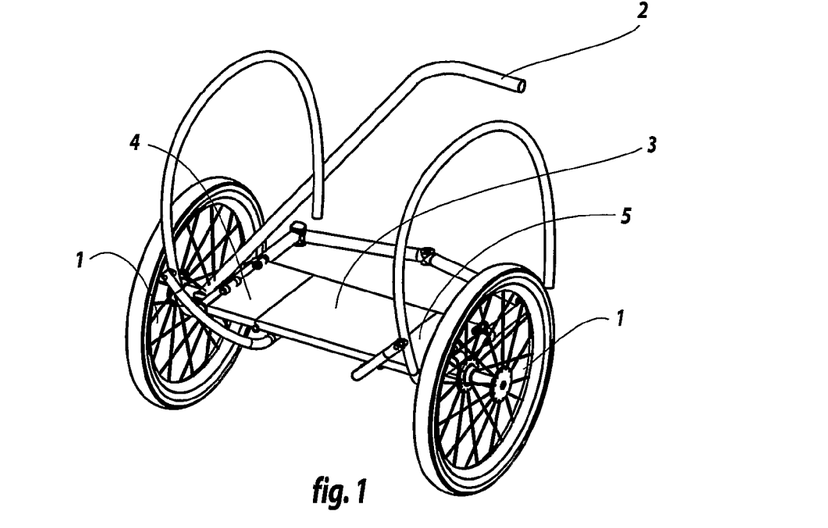
FIG. 1 shows a schematical view of a first embodiment of a vehicle in a configuration for use as trailer.
Figure 2:
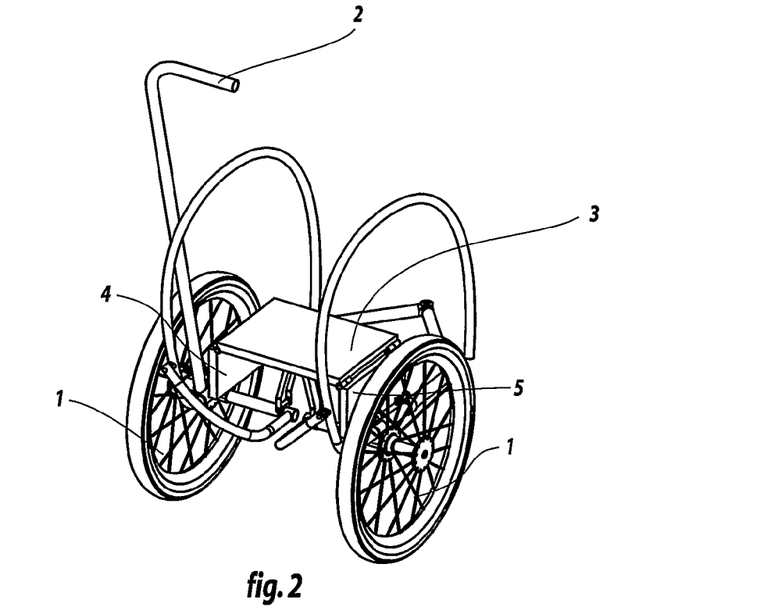
FIG. 2 shows a schematical perspective view of the embodiment from FIG. 1, in a configuration as pushable buggy.

In FIGS. 1 and 2 a vehicle comprises a tube frame, to which two rotatable side-wheels 1 are attached. The tube frame can also contain different than tube-shaped parts and the tubes are not necessarily circle-cylindrical. The vehicle is supported by a ground plane when in use. For the remainder of this description we assume this supporting ground plane is horizontal. The wheels 1 each rotate in an imaginary rotating plane defined by the wheel. The rotation planes do not necessarily have to be vertical or parallel, since the vehicle may have an amount of toe-in and a camber angle. The center of the rotating movement in the rotation plane is here referred to as rotation center. If the wheels are in contact with the ground plane, the vehicle will move in the riding direction when the wheels turn. In case the vehicle has an amount of toe-in, the riding direction is defined by the horizontal component of the bisector of both rotation planes. The vehicle can be transformed from the configuration shown in FIG. 1 into the configuration shown in FIG. 2 and back. In the configuration shown in FIG. 1 the vehicle is suited for use a trailer which can be towed by another vehicle. The increased stability of the configuration from FIG. 1 renders the vehicle especially suitable for use as a trailer towed by a two wheeled vehicle. The concept of two wheeled vehicle comprises bicycles, mopeds, slopeds, with or without extra support wheels. Also eligible are more-wheeled light powered vehicles, and human powered reclining bicycles, tricycles and quadricycles.

An assembly of a hitch 2 and the vehicle constitute a trailer, suitable for being towed by a bicycle. The hitch 2 can be connected to a bicycle (not shown), for instance below the seatpost or near the rear wheel hub. The hitch 2 is attached swiveling to the the frame. More specifically, the hitch is swiveling about a mainly perpendicular to the riding direction and when in use mainly parallel to the ground oriented axis. As such, the hitch 2 can be folded up, as shown in FIG. 2.

In the configuration shown in FIG. 2 the vehicle is suited for use a pushable buggy. The hitch 2 can then be used to push the buggy.

In the configuration shown in FIG. 1 the track width is larger than in the configuration shown in FIG. 2. Thus, the distance between the respective rotation centers of the wheels measured perpendicularly to the riding direction is wider.

In an alternative embodiment (not shown) the distance between the respective rotation centers in the configuration as trailer is equal or even smaller, but the axles about which the wheels 1 rotate are oriented angular, so that the wheels have a camber angle. In such a way the track width, and therefore the stability, is increased.

The vehicle in the shown embodiment shows a cargo-floor, which is also suitable as seat, comprising an middle part 3 and two extreme parts 4,5. The three parts 3-5 are positioned in-line, perpendicular to the riding direction and mainly parallel to the ground supporting the wheels 1. The parts 3-5 are hingeably joined. The extreme parts 4,5 are further hingeably joined to a part of the frame that in the riding direction is rigidly attached to a wheel suspension point. The wheel suspension point in this regard is the part of the frame that, through bearings, supports the wheel hub. By means of the hinging joints of the three parts 3-5, the middle part moves in a vertical direction when the track width is adapted. The middle part 3 has, measured perpendicular to the riding direction, such dimensions that a child can take place on it. In an alternative embodiment the middle part 3 contains a child seat. This way, by transforming from the first to the second configuration both the center of gravity and the track width are adjusted in loaded state.

Figure 3:
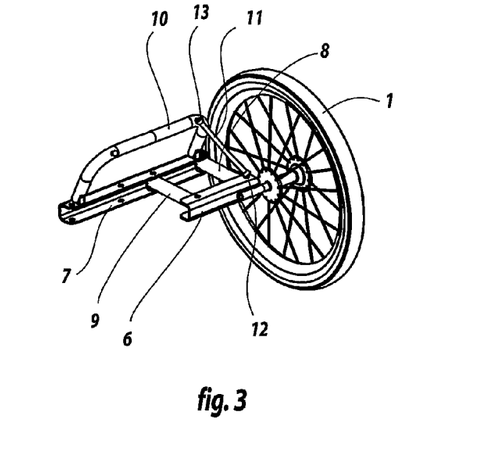
FIG. 3 shows a schematical perspective view of a parallelogram mechanism according to a further embodiment in a configuration for use as a pushable buggy.
Figure 4:
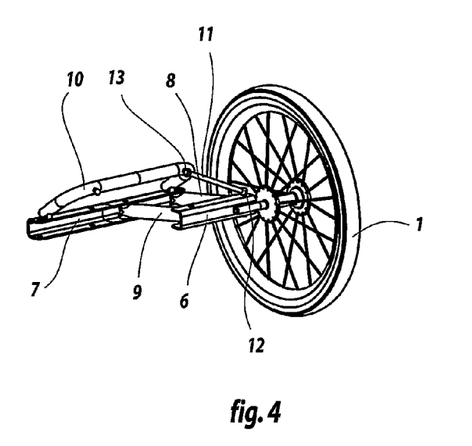
FIG. 4 shows a schematical perspective view of a parallelogram mechanism from FIG. 3, in an intermediate position between a configuration as trailer and a configuration for use as pushable buggy
Figure 5:
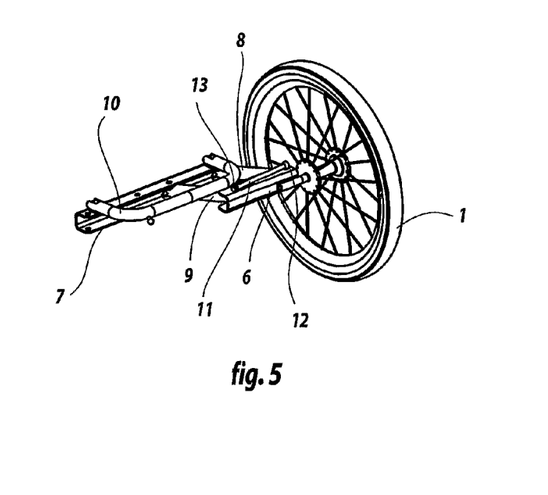
FIG. 5 shows a schematical perspective view of a parallelogram mechanism from FIG. 3, in a configuration for use as a trailer.

In FIG. 3-5 one of the two parallelogram mechanisms of another preferred embodiment of a vehicle according to the invention is shown. The state of FIG. 3 corresponds with the configuration as pushable buggy. The state of FIG. 5 corresponds with the configuration as bike trailer. FIG. 4 shows the stat in a third configuration, between the first and second configuration. A parallelogram mechanism comprises a traversing support construction, by means of which the suspension point of wheel 1 is connected to a main part of the frame which carries the cargo. The wheel suspension comprises a parallelogram defined by four parts 6-9. The four part 6-9 are joined hingeably. A first part 6 is positioned perpendicular to the riding direction and parallel to the wheel supporting ground. A second part 7 defines one side of the parallelogram which is parallel to the side defined by the first part 6. In extension of part 6 lies the wheel suspension point. Depending on the angle between the parts that form the parallelogram the wheel suspension point lies further inward or outward.

Through a rod 11 a bracket 10 determines the position of the sides of the parallelogram. Through ball joints 12,13 the rod 11 is connected to the bracket 10 respectively the first part 6. The bracket 10 swivels about an axis which is fixed relative to the second part 7. This way the wheel suspension points are moved simultaneously by swiveling the bracket 10.

In another (not shown) preferred embodiment the bracket 10 is further connected to a cargo carrying part of the frame and is the axle about which bracket 10 swivels oriented in such a way that the cargo carrying part is translated in a vertical direction, that is, a direction with a vertical component. In a further embodiment hereof a second bracket, swiveling mounted in fashion comparable to bracket 10, to a is present which is mounted swiveling at a further point of the cargo carrying part, in such a way that the cargo carrying part is steadily connected to the vehicle in both configurations. In particular, the connection can be arranged in such a way that the cargo carrying part, when transforming between the first and the second configuration, also moves along the riding direction relative to the wheel suspension points. This way, the center of gravity of the in buggy configuration shown in FIG. 3 can be located further forward, and in a configuration for use as bike trailer closer to the wheel axles.

The embodiments shown in FIG. 6-9 comprise a system of two parallelogram mechanisms for adjusting the width of the vehicle as well, wherein the parallelogram mechanisms are rotated one quarter in a plane parallel to the ground relative to the embodiments shown in FIG. 1-5.

By doing so, two, along the riding direction separated, parts of the chassis 14 and 15 are created, each provided with a wheel suspension point, which can move towards or away from each other during the adjustment of the width of the vehicle. The embodiment shown in FIG. 6 and FIG. 7 comprises a rod 11 as well, which moves a cargo carrying part 16 shaped as a seat, and which is further connected to one part of the chassis 14 by means of two hinging beams 17 and 18 when adjusting the width of the vehicle. An L-shaped support 19, which is rigidly connected to the opposing part of the chassis 15, moves away from the cargo carrying part 16 by widening the vehicle, in such a way, that a supplementary piece of cloth 20 which is attached between one side of the cargo carrying part 16 and the L-shaped support 19 fills up the space occurring from the widening, because it stretches between the cargo carrying part 16 and the L-shaped support 19, whereby an extended seat, particularly useful for placing two infants, is made. It must be observed that the supplementary piece of cloth 20 is drawn with a cutaway to provide a view on other parts of the mechanisms.

Figure 6:
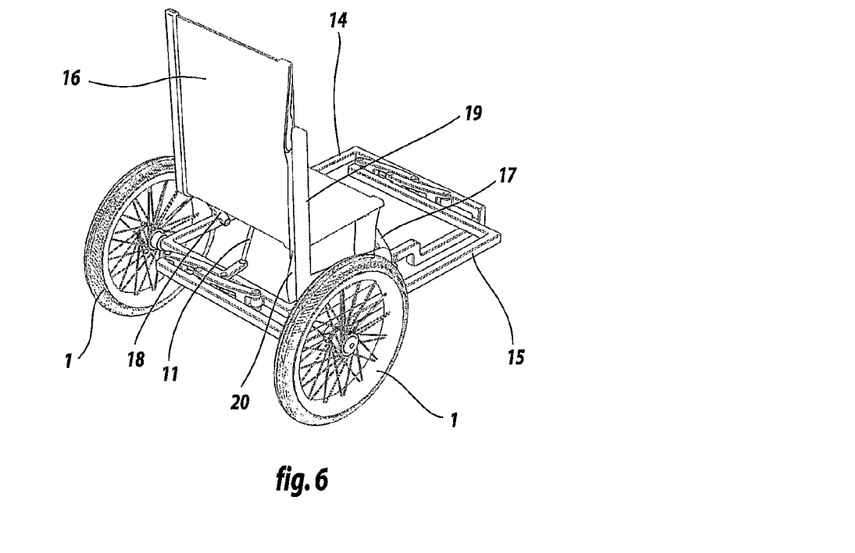
FIG. 6 shows a schematical view of an embodiment of a vehicle in a configuration for use as pushable buggy.
Figure 7:
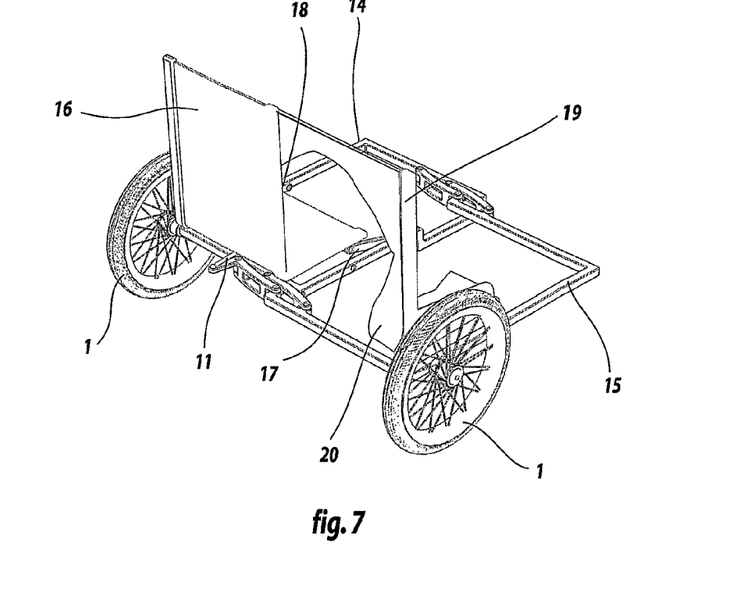
FIG. 7 shows a schematical perspective view of the embodiment from FIG. 6, in a configuration for use as trailer.
Figure 8:
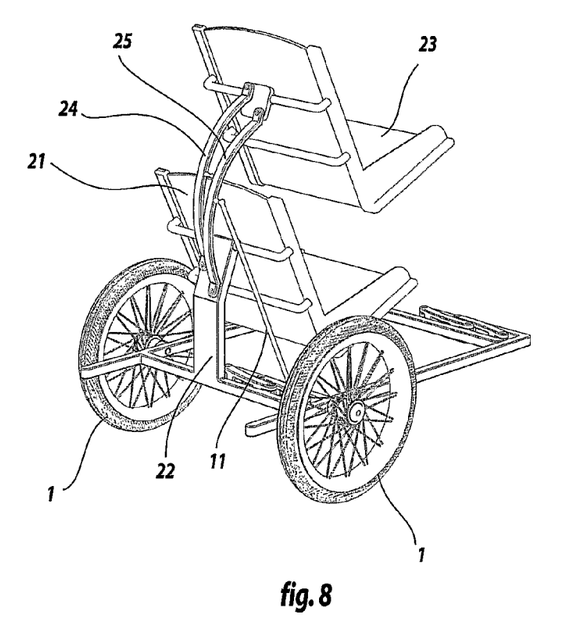
FIG. 8 shows a schematical view of an embodiment of a vehicle in a configuration for use as pushable buggy.
Figure 9:
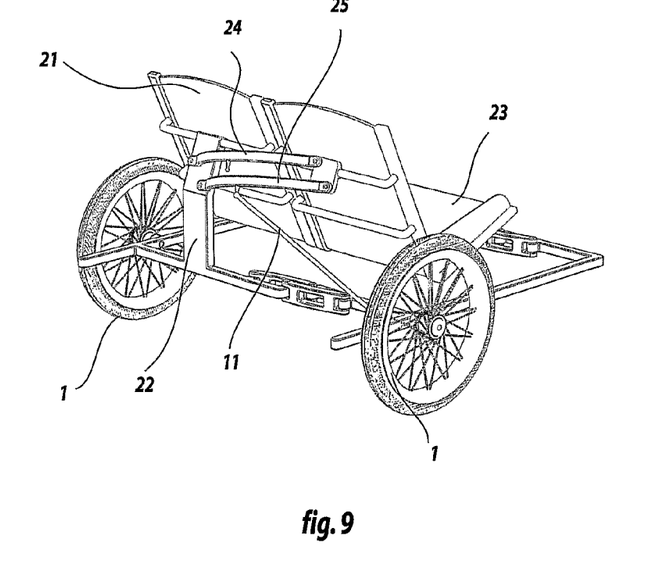
FIG. 9 shows a schematical perspective view of the embodiment from FIG. 8, in a configuration for use as trailer.

Like in the embodiment shown in FIG. 6 and FIG. 7, a rod in the embodiment shown in FIG. 8 and FIG. 9 controls a mechanism for changing the seats, in this embodiment however, one seat 21 is rigidly connected to one part of the chassis 22, where another seat 23, which in the configuration as bike trailer as shown in FIG. 9 creates a wide seat for two children, by means of two beams 24, 25 can swivel to a position before and above seat 21 by transforming the vehicle into the pushable buggy as shown in FIG. 8. This embodiment thus provides space for two infants in both configurations, while the external dimensions in the pushable buggy configuration are substantially smaller, to the benefit of maneuverability in narrow spaces. In a further embodiment (not shown) of this vehicle the swiveling mechanism for the translation of seat 23 comprises a third beam to increase the stability of the construction, particularly in the configuration as pushable buggy.

The embodiments shown in FIG. 1-9 may of course be further provided with additional frames, support wheels, shells and upholstery to create for example canopies, footrests and so forth, all in order to offer complete and comfortable vehicles. These vehicles can also be equipped with locking and safety means in order to make sturdy and safe constructions.

FIG. 10-16 show a further embodiment of the vehicle according to the invention, where a cargo carrying part 26 is build as a two persons seat, which is connected to, by means of two, relative to each other, symmetrically positioned parallelogram mechanisms, comprising of systems of upper beams 27 and lower beams 28 which are hingeably connected to the cargo carrying part 26, axle supports 29, which are hingeably mounted at the side opposed to the hinges of the cargo carrying part 26.

In the shown preferred embodiment the proportions of the beams 27 and 28, and the positions of the hinges of the cargo carrying part 26 and the axle supports 29, are designed in such a way that the beams are just adjacent to each other in their extreme positions belonging to both configurations of the vehicle, which improves the stability of both configurations, whereas these adjacent positions are particularly useful for fitting in locking mechanisms (not shown) which operate preferably automatically, which can maintain the extreme positions in a very tightly, in order to offer an even safer vehicle in both configurations.

Figure 10:
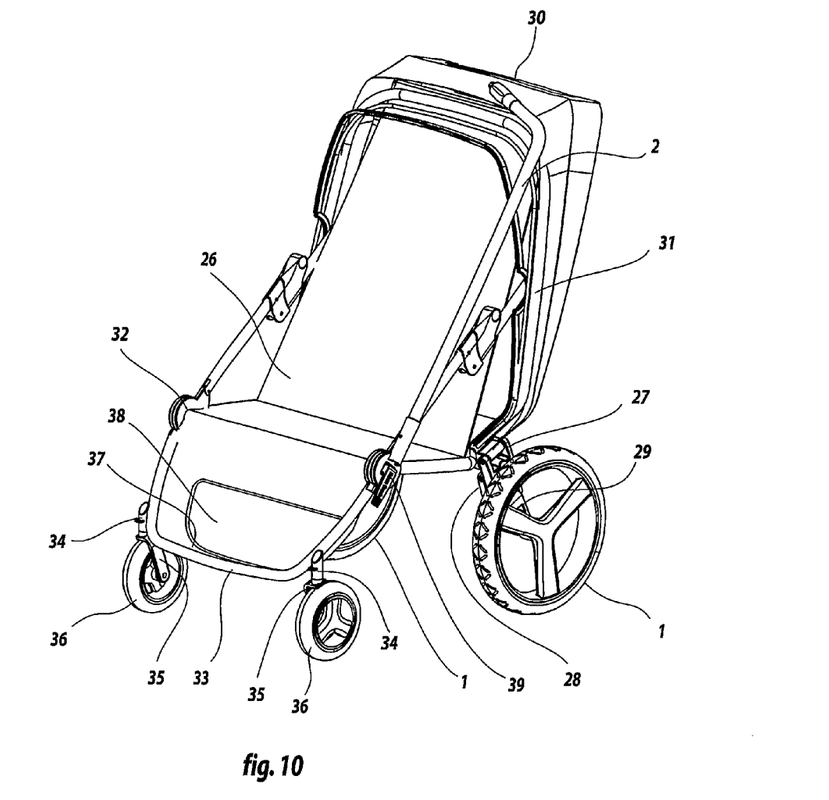
FIG. 10 shows a schematical perspective view of an embodiment of a vehicle in a configuration for use as pushable buggy.
Figure 11:
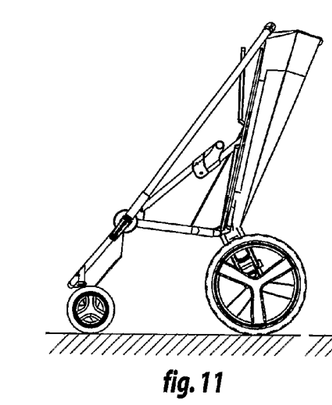
FIG. 11 shows a schematical side view of the embodiment from FIG. 10, in a configuration for use as pushable buggy.
Figure 12:
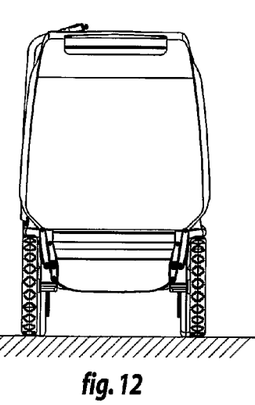
FIG. 12 shows a schematical rear view of the embodiment from FIG. 10, in a configuration for use as buggy.
Figure 14:
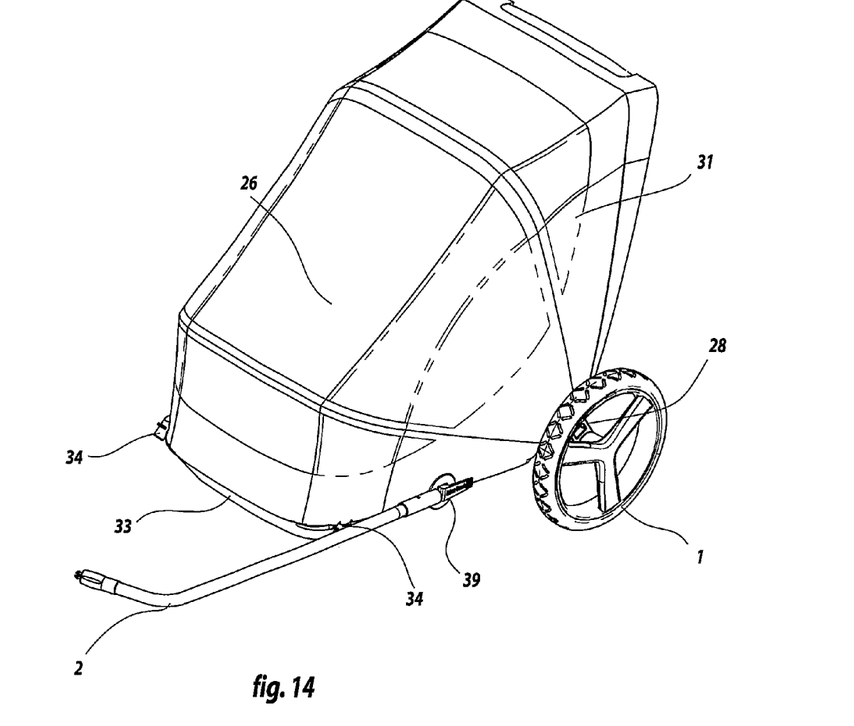
FIG. 14 shows a schematical perspective view of the embodiment from FIG. 10, in a configuration for use as trailer.
Figure 15:
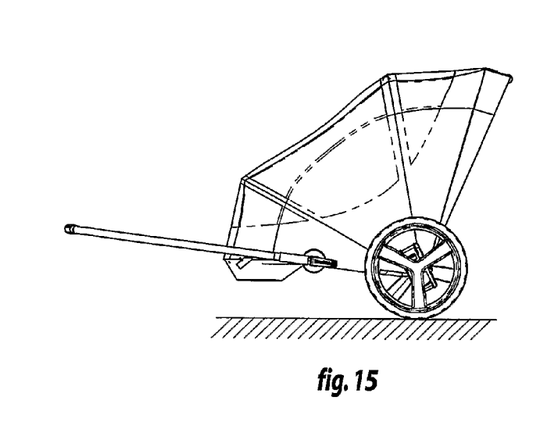
FIG. 15 shows a schematical side view of the embodiment from FIG. 10, in a configuration for use as trailer.
Figure 16:
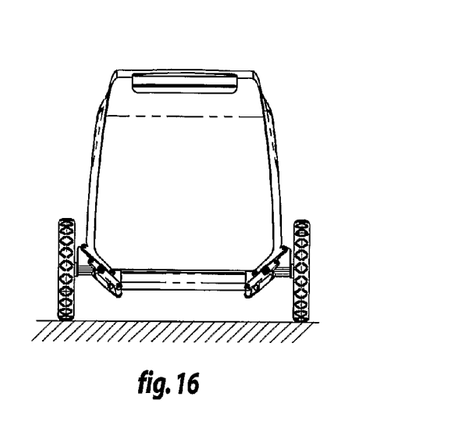
FIG. 16 shows a schematical rear view of the embodiment from FIG. 10, in a configuration for use as trailer.

The vehicle according to FIG. 10-16 further comprises a swiveling hitch 2, which is swiveled upwards in FIG. 10-12, and downwards in FIG. 14-16, a pushing bar 30 and a folding canopy-construction 31 which is folded up in FIG. 10-12 and down in FIG. 14-16, and an about a fixable axis 32 rotating front bracket 33 provided with two supporting wheel swivel-axis supports 34 for removable swivel-axes for support wheel forks 35 with support wheels 36.

The swiveling front bracket further contains two foot supports 37 and 38, where foot support 37 is positioned in such a way that it offers foot support in the configuration as pushable buggy shown in FIG. 10-12, and foot support 38 in such a way it provides foot support in the configuration as bike trailer as shown in FIG. 14-16. Preferably the front bracket 33 can swivel in such a way that it is positioned more or less parallel to the ground in the configuration as bike trailer, so that the support wheels, in case they have not been removed by taking the swivel-axes out of the swivel-axis supports 34, can not touch the ground, therewith offering a good maneuverability of the bike trailer combination, and in the configuration as pushable buggy is lowered until the the support wheels touch the ground, where the orientation of the swivel-axis supports 34 is perpendicular to the ground, creating a set of well swiveling castors for an easy to maneuver pushable buggy, and shortening the vehicle length in the riding direction significantly, which in turn improves the maneuverability in narrow spaces. It must be observed that the support wheels 36 with forks 35 are not shown in FIG. 13-16. The fixable axis 32 is preferably equipped with a multi-position locking mechanism 39, which enables quick and easy fixation of the front bracket 33 as well as the hitch 2 in multiple positions which correspond with the different configurations, including optional compact storage, transport and docking configurations of the vehicle. It needs to be mentioned that the bracket 33 may just as well be equipped with a single support swivel wheel, as well as one or two non-swiveling support wheels, depending on different requirements for for instance maneuverability.

Figure 13:
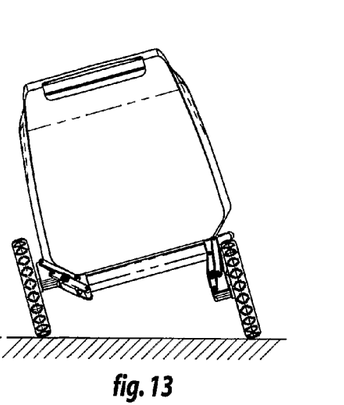
FIG. 13 shows a schematical rear view of the embodiment from FIG. 10 in a somewhat slanted intermediate position.

FIG. 13 shows the vehicle according to the preferred embodiment of FIG. 10-12 and 14-16 in a more or less slanted intermediate position, which occurs when one of the parallelogram mechanisms is in pushable buggy configuration while the other is in bike-trailer configuration.

This somewhat slanted position may occur when changing the vehicle from one configuration into the other. Apparently, this slanted position, as long as the angle relative to the ground is not in excess of 15 degrees, constitutes no hinder for the juvenile passengers of the vehicle, as they are likely to sleep through the change of configuration, provided it is carried out carefully.

The controls for the applicable locking mechanisms for locking and unlocking both the different positions of the front bracket 33, the hitch 2, and/or the parallelogram mechanisms are, in an other (not shown) preferred embodiment, located at easy to reach and operate places on the vehicle, such as the pushing bar 30.

The embodiment shown in the figures may all be provided with safety belts to ensure a safe seating posture.

The invention is not limited to the embodiments described above, as they can be altered within the scope of the accompanying claims. Apart from that, from each embodiment one, two and possibly three and more child versions are possible, which in at least one of the configurations are equipped for concurrent transport of multiple infants, next or behind each other. However, in both pushable buggy as bike trailer configuration there is always place for at least one infant.

Apart from use as child transportation means, the invention is also suitable for transportation of goods, with which a narrowed down and raised configuration can be used as shopping cart, and a widened and lowered configuration is suitable for use as bike cargo-trailer.

The invention claimed is:

1. Vehicle for carriage of children, comprising a frame and at least two wheels which are attached to the frame, which vehicle can be transformed between at least a first configuration as pushable buggy and a second configuration for use as a towed trailer, and in both first and second configurations provides room for at least one child, wherein the vehicle can be transformed between the first and second configurations by adjusting the frame, in such a way that the center of gravity in the first configuration is located further from the ground and further forward in the riding direction, and that the width of the vehicle is smaller than in the second configuration.

2. Vehicle according to claim 1, wherein transformation per side is achieved by one single operation.

3. Vehicle according to claim 1, further comprising a mechanism for synchronization of the transformation of each side.

4. Vehicle according to claim 1, further comprising a part for carriage of cargo, comprising at least three hingeably interconnected parts in a row perpendicular to the riding direction, of which two extreme parts each are hingeably joined to a part of the frame which, when in use, in a direction perpendicular to the riding direction is rigidly connected to a wheel suspension point.

5. Vehicle according to claim 1, wherein at least one wheel suspension point is connected to a main part of the frame by means of a traversing support construction, which traversing support construction comprises four hingeably joined parts in the shape of a parallelogram, and where the wheel suspension point is rigidly connected to one of the four sides of the parallelogram.

6. Vehicle according to claim 5, further comprising a bracket that can swivel about a swiveling axis, and a rod, where the rod on a first point is hingeably joined to a first point at the bracket at a distance from the swiveling axis, and at a second point is hingeably joined to a part which is rigidly connected to a wheel suspension point, in such a way that the wheel suspension point is translated by swivelling the bracket.

7. Vehicle according to claim 6, wherein the bracket is linked to a cargo carrying part of the frame and the swiveling axis is oriented in such a way that the cargo carrying part is moved perpendicular to the moving direction of the wheel suspension points.

8. Vehicle according to claim 5, wherein each parallelogram formed by four hingeably joined parts lies in a slanting plane.

9. Vehicle according to claim 5, wherein systems of two hingeably joined parts in both extreme position of the traversing support construction are adjacent to each other.

10. Vehicle according to claim 5, further comprising mechanisms for locking of the extreme positions of the traversing support construction.

11. Vehicle according to claim 10, wherein locking takes place automatically when the traversing support constructions reach their extreme positions.

12. Vehicle according to claim 5, wherein the proportions and positions of the hingeably joined parts are chosen in such a way, that the cargo carrying part at its bottom side lies below the wheel axles.

13. Vehicle according to claim 1, wherein the transformation for the first to the second configuration is aided by gravity.

14. Vehicle according to claim 1, wherein length of the vehicle along the riding direction is made shorter in the first configuration than in the second configuration by means of a swiveling front bracket.

15. Vehicle according to claim 14 wherein the front bracket can be provided with support wheels which touch the ground when swivelling towards the first configuration.

16. Vehicle according to claim 14, wherein the front bracket comprises a part with foot supports for both configurations of the vehicle.

17. Vehicle according to claim 1, further comprising a seat which width varies when the vehicle is transformed from one configuration to the other.

18. Vehicle according to claim 1, further comprising a movable cargo carrying part which is moved by a system of beams, wherein this cargo carrying part is located above and before in the first configuration and in the second configuration next to a cargo carrying part which is fixed to the frame.

19. Vehicle according to claim 1, wherein the wheels are positioned under a cargo carrying part of the frame.

20. Vehicle according to claim 1, wherein transforming from one to the other configuration can be performed by lifting each side of the vehicle in turn via a stable and somewhat slanted intermediate position.

21. Vehicle according to claim 1, wherein it is made especially suitable for transportation of goods.

* * * * *